United States Patent
Wilson

[15] 3,652,425
[45] Mar. 28, 1972

[54] PROCESS FOR THE PREPARATION OF HETEROPOLY ACID COMPLEX COMPOUNDS OF METAPHOSPHORIC METASILIC ACID, METAPHOSPHORIC ACID AND PHOSPHOROUS PENTOXIDE

[72] Inventor: Harold W. Wilson, El Paso, Tex.
[73] Assignee: Wilson Laboratories, Inc.
[22] Filed: Feb. 18, 1969
[21] Appl. No.: 800,292

[52] U.S. Cl....................252/194, 23/165, 23/223, 252/437, 252/449
[51] Int. Cl........................B01d 17/00, C09k 3/00
[58] Field of Search............252/194, 437, 449; 23/165, 23/182, 223

[56] References Cited

UNITED STATES PATENTS 2,967,153   1/1961   Houston.........................252/194
3,264,086   8/1966   Hollingsworth et al............23/165

Primary Examiner—Richard D. Lovering
Assistant Examiner—Irwin Gluck
Attorney—Clarence A. O'Brien and Harvey B. Jacobson

[57] ABSTRACT

A process for the production and recovery of oxygen containing compounds of phosphorous or silicon from starting materials comprising orthophosphoric acid and amorphous silica or its hydrates by adding siliceous material to an aqueous solution of orthophosphoric acid and thereafter heating the resulting product to dissolve the added silica and then to effect volatilization and boiling off of at least some of the water of solution and combined water of hydration of said product and continuing the heating to obtain a dry solid product which is at least one oxygen containing compound of phosphorous and/or silicon.

24 Claims, No Drawings

PROCESS FOR THE PREPARATION OF HETEROPOLY ACID COMPLEX COMPOUNDS OF METAPHOSPHORIC METASILIC ACID, METAPHOSPHORIC ACID AND PHOSPHOROUS PENTOXIDE

This invention relates to dry granular products useful as desiccants and as source materials for the preparation of phosphorus-oxygen compounds, including $P_2O_5$ and metaphosphoric acid and as novel compositions comprised of oxygen, silicon and phosphorus, and to the preparation of such products. More particularly, the present invention relates to the novel products recoverable by controlled heating to effect the elimination of water from aqueous solutions of orthophosphoric acid to which either amorphous silica or its hydrates, i.e., metasilicic acid, disilicic acid or orthosilicic acid, have been added.

One object of the invention is to provide a process whereby any aqueous solutions of orthophosphoric acid regardless of their contents of trihydrogen phosphate ($H_3PO_4$) can be converted into one or many kinds of several new compositions of matter free of water and existing in the form of granular and/or powdery solids.

Another object of the invention is to provide a process for preparing new compositions of matter which are capable of maintaining such extremely high rates of water pickup that their percent weight gain from pickup of water per time unit exceeds by more than twice the water pickup under the same conditions of granular phosphorus pentoxide (99+% $P_2O_5$), one of the most efficient desiccants known.

Still another object of the invention is to recover metaphosphoric acid($HPO_3$) and/or phosphorus pentoxide ($P_2O_5$) directly from aqueous solutions of orthophosphoric acid without first reducing the phosphorus content of such acid to elemental form followed by burning the elemental phosphorus in excess oxygen as is presently practiced.

A further object of the invention is to provide a process for the manufacture of new compositions of matter containing equivalent $P_2O_5$ in amounts up to and greater than 80 percent of the weights of such products which have such equivalent $P_2O_5$ present either in the form of metaphosphoric acid ($HPO_3$), as metaphosphoric acid ($HPO_3$) and phosphorus pentoxide ($P_2O_5$) in combination, or as phosphorus pentoxide ($P_2O_5$). Such products can be prepared so as to contain predetermined quantities of equivalent $P_2O_5$ as may be desired ranging in amount from traces up to more than 80 percent of the weights of such products.

Another object of the invention is to provide a process for the production of new compositions of matter whose molecules contain one (1) single strongly ionizable hydrogen ion per each phosphorus atom present in its structure and no content of weakly ionizable hydrogen ions whatsoever with such compositions of matter existing as dry, granular, solid substances capable of displaying strong acidic properties especially when brought into contact with either inorganic or organic bases.

Still a further object of the invention is to provide for the production of heteropoly complex acid compounds containing metasilicic acid and its polymers and metaphosphoric acid where a molecular ratio of silicon dioxide ($SiO_2$) to phosphorus pentoxide ($P_2O_5$) can be varied between 4 mols $SiO_2$ : mol $P_2O_5$ to 1 mol $SiO_2$ : 4+ mols $P_2O_5$; and further, for the production of compounds containing metasilicic acid, metaphosphoric acid, and phosphorus pentoxide, all in combination and for the production of compounds containing silicon dioxide in combination in equal ratio such as $SiO_2:P_2O_5$ represented by the compound, silicon pyrophosphate, $SiP_2O_7$ which after preparation can be heat decomposed to liberate sublimed $P_2O_5$ and a residue of nonvolatile crystalline silicon dioxide ($SiO_2$) without resorting to the use of white heat temperatures (1,260° C. and above) to effect such decomposition and liberation of sublimed $P_2O_5$ as is conventionally required.

These and other objects in addition to those noted above will become apparent in the disclosure of this invention which follows.

Essentially, and briefly stated, the process of this invention comprises heating aqueous solutions of orthophosphoric acid to which have been added either amorphous silica ($SiO_2$) or its hydrates: metasilicic acid, disilicic acid, and orthosilicic acid to bring about the following:

1. Dissolution of the added siliceous material followed by volatilization and boiling off of the uncombined water of solution and the combined water of hydration of the orthophosphoric acid, thereby producing solid heteropoly complex acid compounds of the nature of $H_2SiO_3 \cdot X\ HPO_3$, this being accomplished by heating at temperatures below 300° C.;

2. Effecting condensation and partial dehydration of the metaphosphoric acid component of the $H_2SiO_3 \cdot X\ HPO_3$ so produced by further heating at temperatures between 300° and 575° C. thereby further volatilizing the water of constitution of the metaphosphoric acid, to form solid heteropoly acid complexes with $P_2O_5$ adducts of the nature of $H_2SiO_3 \cdot X\ P_2O_5 \cdot hpo_3$:

3. Decomposing the complexes of "2." above to release volatile metaphosphoric acid per se and leave a nonvolatile residue of solid silicon pyrophosphate, $SiP_2O_7$ by further heating at temperatures between 575° and 800° C.;

4. Effecting decomposition of the silicon pyrophosphate of "3." above to from a sublimate of $P_2O_5$ and leave a residue of nonvolatile crystalline silicon dioxide by further heating at temperatures between 800° and 1,000° C. The values for X and Y of the complex compounds noted above are directly related to and dependent upon the quantities of orthophosphoric acid ($H_3PO_4$) present in the aqueous solutions of orthophosphoric acid employed in the process.

The following chemical equations are considered to be illustrative of the reactions taking place in the above described process:

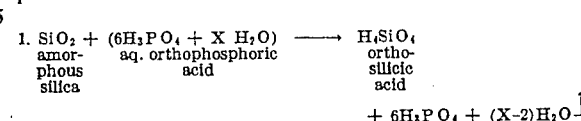

(X is equivalent to 2 to 50 mol wgts. $H_2O$ per mol $H_3PO_4$)

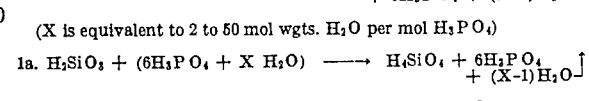

(X is equivalent to 1 to 50 mol wgts. $H_2O$ per mol $H_3PO_4$)

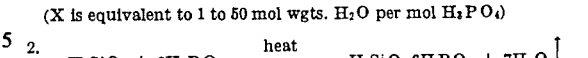

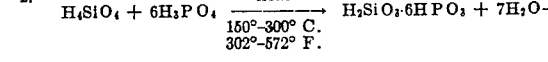

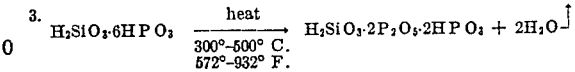

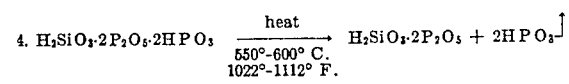

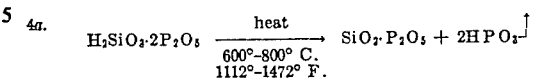

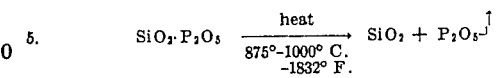

At least partial polymerization of the metasilicic acid occurs in some of the above reactions causing the formation of disilicic acid, $H_4Si_2O_6$ for example. However no evidence was found that the metaphosphoric acid polymerized to the di-, tri-, etc., forms as would be indicated by $(HPO_3)_n$ representation but rather the metaphosphoric acid remains present in monomer form represented by $nHPO_3$.

While not wishing to be bound by any specific theory it is believed that the affinity for water exhibited by metasilicic acid and polymers of silicic acid is so much greater than the affinity for water exhibited by metaphosphoric acid that when mixtures of silicic and metaphosphoric acids are heated, the water of constitution of the metaphosphoric acid is liberated with increase of temperature and inturn taken up by the metasilicic acid in its attempt to form orthosilicic acid which in turn brings about the formation of silicic acid polymer complexes and the liberation of the water as steam, as in the equations which follow:

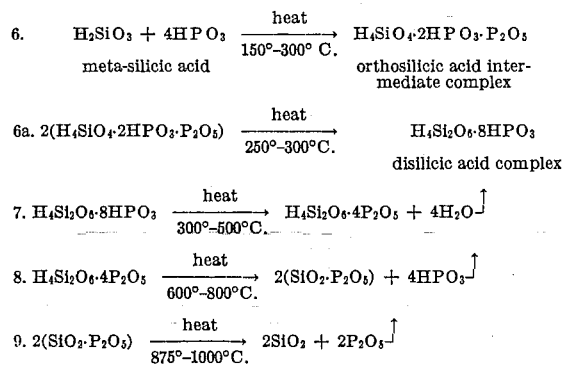

6. $H_2SiO_3 + 4HPO_3 \xrightarrow[150°-300°C.]{heat} H_4SiO_4 \cdot 2HPO_3 \cdot P_2O_5$ meta-silicic acid    orthosilicic acid intermediate complex 6a. $2(H_4SiO_4 \cdot 2HPO_3 \cdot P_2O_5) \xrightarrow[250°-300°C.]{heat} H_4Si_2O_6 \cdot 8HPO_3$ disilicic acid complex 7. $H_4Si_2O_6 \cdot 8HPO_3 \xrightarrow[300°-500°C.]{heat} H_4Si_2O_6 \cdot 4P_2O_5 + 4H_2O \uparrow$ 8. $H_4Si_2O_6 \cdot 4P_2O_5 \xrightarrow[600°-800°C.]{heat} 2(SiO_2 \cdot P_2O_5) + 4HPO_3 \uparrow$ 9. $2(SiO_2 \cdot P_2O_5) \xrightarrow[875°-1000°C.]{heat} 2SiO_2 + 2P_2O_5 \uparrow$ In the above described process, regardless of the products to be made, the rate of heating is not critical and operation at the specified temperatures results in the production of relatively uniform products. It is to be understood that localized overheating is to be avoided to prevent portions of any product from being exposed to temperatures above those desired for the reaction being effected. It is preferable to keep the heating temperature of the particular products themselves under preparation at somewhat lower temperatures (25°–50° lower) than the maximum of the temperature range given for the specific product being prepared. Temperatures in the initial product preparation can be in excess of 300° C. in the early stages of preparation before the temperature of the products themselves will approach or reach the maximum of the cited temperatures.

Use of stoichiometric quantities of silica ($SiO_2$) and orthophosphoric acid ($H_3PO_4$) in the process results in very definite products both as to their qualities and their quantities. For example, it was desired to produce 100 grams of a product for use as a desiccant. The product was to contain approximately 60 grams of equivalent $P_2O_5$ and to have a composition defined by the empirical formula, $H_2SiO_3 \cdot 2HPO_3$ and to be of a composition as follows: 25.2% $SiO_2$, 8.6% $H_2O$, and 67.2% $HPO_3$. The product was made by heating a mixture of 110 grams of aqueous orthophosphoric acid solution of 75% $H_3PO_4$ content and 26.5 grams of diatomaceous silica known to contain 95.5% $SiO_2$ until the temperature of the resultant product itself reached 275° C. after which it was cooled and weighed. The finished product weighed 100.7 grams. Chemical analysis of the product showed it to contain 59.52% equivalent $P_2O_5$ and to be composed of 24.92% $SiO_2$, 8.01% $H_2O$, and 67.07% $HPO_3$.

10 grams of the above product was accurately weighed into a flat bottomed dish and the dish with contents was placed in a desiccator containing a second dish holding 75 ml. of an aqueous solution of sulfuric acid (39% $H_2SO_4$). The dish with product was removed periodically from the desiccator during a 100 hour exposure period to the aqueous sulfuric acid solution in order to determine its weight gain caused by removal of water from the aqueous sulfuric acid solution by the prepared desiccant. Water removal by the product prepared as noted above in comparison with water removal by the same method of test by the best known grade of commercially available granulated $P_2O_5$ (99.0+% $P_2O_5$) is shown in the following tabulated results:

| Time | Process Product (granular 59.52% $P_2O_5$) | Commercial Product (granular 99.0+% $P_2O_5$) |
|---|---|---|
| % Wgt. Gain in 5 hrs. | 4.2% | 2.3% |
| % Wgt. Gain in 20 hrs. | 15.0% | 6.6% |
| % Wgt. Gain in 50 hrs. | 29.0% | 13.2% |
| % Wgt. Gain in 75 hrs. | 37.5% | 18.9% |
| % Wgt. Gain in 100 hrs. | 43.1% | 23.6% |

Upon completion of the water pickup test the desiccant product, in its same container, was heated to a temperature of 220° C. for 1 hour, cooled and weighted. The water the desiccant had taken up under test was released and the initial 10 grams of product was found present in the dish. The dish and contents were re-exposed to the 39% $H_2SO_4$ aqueous solution of sulfuric acid for a second series of water pickup tests, the results of which were in close agreement with those previously obtained showing that the product could be hydrated, dehydrated, and rehydrated and thus serve as a better desiccant than best quality commercial granular $P_2O_5$.

It is essential to use the amorphous form of silica in this process in order to obtain the orthosilicic acid intermediate compound. All of the following listed grades, classes, and types of amorphous silica under various name designations have been found suitable for use: infusorial earth, siliceous or diatomaceous earth, kieselguhr, fossil flour, "Dicalite," "Kenite," "Multicel," hydrated silica and silicic acid ($H_2SiO_3$), hydrated silicic acid with adsorbed water ($H_2SiO_3 \cdot nH_2O$ with $n$ = 1 to 30 mols), and orthosilicic acid ($H_4SiO_4$ prepared by reacting orthosilicate salts with mineral acids).

Solutions of pure orthophosphoric acid having $H_3PO_4$ concentrations ranging from as little as 1% $H_3PO_4$ to 100% have been used in this process provided sufficient water to meet stoichiometric requirements was also present as such or in the hydrated silica ingredients when same were used. Aqueous solutions of impure orthophosphoric acid could be employed where such impurities were determined to be predominantly meta- and pyrophosphoric acids. Impure acids containing as much as 4% pyrophosphoric acid ($H_4P_2O_7$), 12% metaphosphoric acid ($HPO_3$), and 34% orthophosphoric acid ($H_3PO_4$) to give a content of 53% of equivalent $H_3PO_4$ used stoichiometrically based on their $H_3PO_4$ equivalents produced highly satisfactory products meeting both quality and quantity requirements for product manufacture.

The relative proportions of amorphous silica to orthophosphoric acid alone or in combination with either or both pyro- and metaphosphoric acids can be varied over wide ranges, and since the resulting mixtures can be subjected to any one or to all of four rather well defined temperature ranges to form compounds similar to those illustrated in equations 2 and 6a.; 3 and 7, 4, 4a. and 8, and 5 and 9 it can be readily appreciated that the use of the process permits the preparation of a nearly unlimited number of chemical compounds.

In general, when the ratio of $H_3PO_4:SiO_2$ exceeds approximately 8:1 the removal of all of the water of constitution of the $H_3PO_4$ becomes more difficult and products heated to temperatures approaching 300° C. are very hygroscopic and tend to remain as sticky, pasty solids; when heated to temperatures approaching 500° C. they become less hygroscopic but are sticky, solid substances; when heated to 800° C. with loss of $HPO_3$ they become non-hygroscopic or nearly so and are no longer sticky but become glassy, granular solids. Conversely, with increase of $SiO_2:H_3PO_4$ ratio (for example, from 1:1 to 2:1) the removal of the water of constitution occurs very rapidly resulting in powdery products which are relatively non-hygroscopic. In general, the water solubilities of the products increase with increasing ratios of $H_3PO_4:SiO_2$ (for example, from 4:1 to 6:1) and decrease with increasing ratios of $SiO_2:H_3O_4$ (for example, from 1:1 to 2:1). Likewise, product solubility in alcohols and in oxygenated organic compounds increases with increasing ratios of $H_3PO_4:SiO_2$ and also with products prepared at lowest temperatures (300° C.).

Products prepared either with $H_3PO_4:SiO_2$ ratios greater than 8:1 and heated up to temperatures of 500° C., or products prepared with $H_3PO_4:SiO_2$ ratios greater than 1:1 and heated to 300° C. temperature exhibit the highest levels of hygroscopicity. Products having $H_3PO_4:SiO_2$ ratios between 2:1 and 6:1 exhibit water pickup capacities greater than 40 parts by weight of water pickup per 100 parts by weight of product per 100 hours of time exposure to aqueous solutions of sulfuric acid (39% $H_2SO_4$). The equivalent $P_2O_5$ contents of the products increase both with increase of $H_3PO_4:SiO_2$ ratios and with increase of heating up to temperatures of approximately 550° C., while the equivalent $P_2O_5$ content is nearly the same percentagewise for all products having ratios of $H_3PO_4:SiO_2$ between 2:1 and 8:1 which have been heated to temperatures of approximately 800° C.

The following table will serve to illustrate relationships between various ratios of $H_3PO_4:SiO_2$ employed in the process, the amounts of equivalents of 100% $H_3PO_4$ used in the forms of aqueous solutions of orthophosphoric acid, the weights of products obtained at the different temperatures used, the percentages of $P_2O_5$ of the products obtained, and the $P_2O_5$ input and recovery relationships.

dissolved substances, for example, the pH values of aqueous solutions containing 0.5 gram of complexes having empirical formulas $H_2SiO_3 \cdot HPO_3$ and $H_2SiO_3 \cdot P_2O_5 \cdot 4HPO_3$ in volumes of 100 c.c. of water were pH 1.6 and pH 1.8 respectively.

If it is desired to use the process primarily to produce metaphosphoric acid ($HPO_3$), solutions in which the ratio of orthophosphoric acid to amorphous silica is preferably greater than $7H_3PO_4:SiO_2$ are first heated to the 500° C. temperature, then are heated to the 800° C. temperature to effect volatilization of the $HPO_3$. The residue after being freed of its content of volatilizable $HPO_3$ can be reprocessed as a starting silica-content raw material with more orthophosphoric acid solution, heated to remove uncombined water and water of con- CHARACTERIZATION OF EXPERIMENTAL PRODUCTS PREPARED WITH VARIED RATIOS OF $H_3PO_4:SiO_2$ CONTENTS

| | | | | | | | |
|---|---|---|---|---|---|---|---|
| Mol. ratios of $H_3PO_4:SiO_2$ | 2:1 | 4:1 | 4.6:1 | 5.2:1 | 6:1 | 7.6:1 | 8.1:1 |
| Aqueous acid solution used exp. in grams of 100% $H_3PO_4$ | 81.8 | 98.0 | 101.0 | 103.1 | 97.8 | 124.1 | 133.3 |
| Silica, 100% $SiO_2$ in grams | 25.0 | 15.0 | 13.5 | 12.1 | 10.0 | 10.0 | 10.0 |
| Product A, in grams from heating mix to 300° C. temp | 98.8 | 99.0 | 100.0 | 100.0 | 92.8 | 114.3 | 122.4 |
| Percent eq. $P_2O_5$ in Product A | 59.0 | 71.2 | 72.8 | 74.5 | 76.1 | 78.6 | 78.7 |
| Product B, in grams from heating Product A to 500° C. temp | 91.3 | 90.1 | 91.9 | 93.1 | 87.5 | 110.0 | 117.6 |
| Percent eq. $P_2O_5$ in Product B | 64.5 | 78.1 | 78.9 | 79.9 | 80.6 | 81.5 | 81.8 |
| Product C, in grams from heating Product B to 800° C. temp | 84.2 | 50.5 | 46.8 | 43.0 | 37.1 | 41.2 | 42.0 |
| Percent eq. $P_2O_5$ in Product C | 62.8 | 70.9 | 70.7 | 70.2 | 70.4 | 69.9 | 70.0 |
| $HPO_3$ volatilized from Product B, in grams | 6.8 | 39.0 | 44.4 | 50.0 | 50.0 | 68.6 | 75.2 |
| Sublimate of $P_2O_5$ from heating Product C to 1,000° C. in grams | 52.7 | 35.7 | 33.0 | 30.0 | 25.8 | 28.8 | 29.2 |
| Residue of $SiO_2$ obtained from heating Product C to 1,000° C. temperature, in grams | 24.8 | 14.8 | 13.7 | 12.7 | 11.3 | 12.0 | 12.5 |
| Total $P_2O_5$ equivalents in grams introduced as raw material | 59.0 | 71.0 | 73.1 | 74.6 | 70.8 | 89.8 | 96.5 |
| Eq. $P_2O_5$ of $HPO_3$ volatilized from Product B, in grams | 6.0 | 34.6 | 39.4 | 44.2 | 44.4 | 60.9 | 66.8 |
| Eq. $P_2O_5$ lost in process, in grams | 0.3 | 0.7 | 0.7 | 0.4 | 0.6 | 0.1 | 0.5 |

NOTE: Aqueous solutions of orthophosphoric acid ranging from concentrations of 35.0% $H_3PO_4$ up to and including concentrations of 88.5% $H_3PO_4$ were used as $H_3PO_4$ source compounds in the above preparations. Silica was employed per se and as freshly precipitated metasilicic acids. All experiments were conducted at atmospheric pressure. Hearing was by both natura gas and electricity.

It is to be noted that the application of the process in the manner described below will provide for the preparation of optimum amounts of products of desired composition.

1. Dry, granular products most suitable for use as heat-regeneratable desiccants and as dehydration reagents are prepared by heating mixtures of orthophosphoric acid and amorphous silica in ratios between $2H_3PO_4:SiO_2$ to $6H_3PO_4:SiO_2$ to temperatures in the range of 275° and 295° C.

2. Dry, granular products most suitable for use as source materials of metaphosphoric acid and phosphate phosphorus in water soluble and hydrolyzable form such as for use in high equivalent $P_2O_5$ content agricultural chemicals are prepared by heating mixtures of orthophosphoric acid and amorphous silica in ratios between $6H_3PO_4:SiO_2$ to $8H_3PO_4:SiO_2$ to temperatures in the range of 475° to 525° C.

3. Dry, granular products most suitable for use as source materials for the production of metaphosphoric acid ($HPO_3$) are prepared by heating mixtures of orthophosphoric acid and amorphous silica in ratios greater than $4H_3PO_3:SiO_2$ to temperatures in the range of 475° to 500° C. after which the resultant products are further heated to temperatures above 600° C. up to 800° C. to liberate volatilized metaphosphoric acid.

4. Dry, granular products most suitable for preparing sublimed $P_2O_5$ are prepared by heating mixtures of orthophosphoric acid and amorphous silica of a ratio of $2H_3PO_4:SiO_2$ to an initial temperature of about 500° C. for the removal of uncombined water and of water of constitution, then heating the water-free residues to temperatures ranging between 885° and 1,000° C. to effect sublimation of $P_2O_5$.

5. Dry, granular products most suitable for use as source materials of strongly ionizable hydrogen ions which allow such products to display strongly acidic characteristics in addition to their possessing very strong dehydration capacities prepared by heating mixtures of orthophosphoric acid and amorphous silica in ratios preferably between $2H_3PO_4:SiO_2$ and $6H_3PO_4:SiO_2$ to either 300° C. temperature to obtain for example the $H_2SiO_3 \cdot HPO_3$ type complex or to 500° C. temperature to obtain for example the $H_2SiO_3 \cdot P_2O_5 \cdot 2HPO_3$ type complex. The strongly acidic character of these types of heteropoly acid complex compounds is confirmed by the pH of aqueous solutions containing very small quantities of such stitution, and heated to the 800° C. temperature. This process can be repeated as often as may be desired. The present invention also comprises a unique process for the preparation of pure metaphosphoric acid, heretofore obtained only by decomposition of metaphosphate salts preferably at temperatures below 0° by mineral acid decomposition reactions. Also, in the customary manner of dehydration of free orthophosphoric acids by the use of heat, mixtures of products of the several stages of dehydration are always obtained and at temperatures above 300° C. a combination of volatilized metaphosphoric acid and sublimed phosphorus pentoxide are liberated. In the process of the present invention neither metaphosphoric acid or phosphorus pentoxide are liberated until red-heat temperatures (585°–950° C.) are reached. In the present process the silicon pyrophosphate ($SiP_2O_7$) produced by prior heating of the heteropoly acid complexes to 800° C. temperature yields the amorphous form of $P_2O_5$ when the silicon pyrophosphate is heated to temperatures in the range of red-heat, about 850° to 1,000° C. which temperatures are far below those of white heat, and yet considerably above the temperature of 250° C., the sublimation temperature of the amorphous form of $P_2O_5$. As conventionally prepared, metaphosphoric acid alone is either syrupy and hygroscopic or is glassy and very sparingly soluble in water with many isomeric forms being possible where the number of different metaphosphoric acids possible is due not only to the number of metaphosphoric acid molecules contained in them, but also as affected by their internal arrangement. In the process of this invention the physical and chemical natures of the metaphosphoric acid can be controlled such as to produce solid rather than liquid (syrupy) products having predetermined capacities for water adsorption and for water solubilities by first forming the heteropoly acid complex compounds of metaphosphoric acid predominantly.

The following example further illustrates the use of the four previously noted temperature ranges in producing predetermined amounts of any one or all of the products possible from processing a mixture of aqueous orthophosphoric acid solution and amorphous silica of a ratio of $4H_3PO_4:SiO_2$ as described below.

A mixture of 23 grams of diatomaceous earth (97.45% $SiO_2$) and 225 grams of aqueous orthophosphoric acid solution composed of 65% $H_3PO_4$ and 35 percent water (such solution containing the equivalent of 105.9 grams of $P_2O_5$) was heated to a temperature of 292° C. to produce 149.8 grams of a dry, solid product designated as product A, shown by chemical analysis to contain the equivalent of 70.7% $P_2O_5$ (equal to 105.9 grams of $P_2O_5$).

149.8 grams of product A (from above) were further heated to a temperature of 500° C. and 134.2 grams of a dry, solid product was recovered, designated as product B, shown by chemical analysis to contain the equivalent of 78.7% $P_2O_5$ (equal to 105.6 grams of $P_2O_5$).

134.2 grams of product B (from above) were further heated to a temperature of 790° C. producing 88.5 grams of a dry, solid product designated product C and 48.1 grams of volatilized metaphosphoric acid ($HPO_3$). Chemical analysis showed product C to contain the equivalent of 70.9% $P_2O_5$ (equal to 62.7 grams $P_2O_5$), and the volatilized $HPO_3$ to contain the equivalent of 88.7% $P_2O_5$ (equal to 42.6 grams of $P_2O_5$).

88.5 grams of product C (from above) were heated to a temperature of 960° C. producing 62.4 grams of a sublimate of 100% $P_2O_5$ content and a residue of 25.9 grams of crystalline silica ($SiO_2$).

Having now described preferred embodiments of my invention, it is not intended that it be limited, except as may be required by the appended claims.

What is claimed as new is as follows:

1. A process for the production and recovery of oxygen-containing compounds of phosphorus or silicon from starting materials comprising orthophosphoric acid and amorphous silica or its hydrates comprising adding siliceous material selected from the group consisting of amorphous silica, metasilicic acid, disilicic acid, and orthosilicic acid to an aqueous solution of orthophosphoric acid and thereafter heating at a temperature below 300° F. to dissolve the added silica and then to effect volatilization and boiling off of at least some of the water of solution and combined water of hydration and continuing said heating to obtain dry solid heteropoly complex acid compounds of the formula $H_2SiO_3 \cdot XHPO_3$ where X is less than about 8.

2. The process of claim 1, including, in addition, steps of heating the heteropoly complex acid to a temperature between 300° and 575° C. and thereby obtaining a product represented by the general formula $H_2SiO_3 \cdot XP_2O_5 \cdot YHOP_3$ where X and Y are each below 10.

3. The process of claim 2, including an additional heating step in which the product is decomposed to release $HPO_3$ as a volatile product and $SiP_2O_7$ as a solid product and separately recovering said $HPO_3$ and said $SiP_2O_7$.

4. The process of claim 3 which comprises, in addition, heating said $SiP_2O_7$ to between 575° and 800° C. add recovering the $P_2O_5$ sublimed from said $SiP_2O_7$.

5. The process of claim 1 wherein the silica starting material is a solid amorphous $SiO_2$.

6. The process of claim 1 wherein the silica starting material is metasilicic acid.

7. A process for the production and recovery of oxygen containing compounds of phosphorous or silicon which comprises the steps of:
   a. adding a siliceous material selected from the group consisting of amorphous silica, metasilicic acid, disilicic acid and orthosilicic acid to a solution of orthophosphoric acid;
   b. heating the resulting product to a temperature below about 300° C. to dissolve said added material and forming solid heteropoly acid complexes;
   c. subsequently heating the solution obtained in (b) to a temperature of between about 300°–575° C. to effect condensation and to form other heteropoly acid complexes with $P_2O_5$ adducts;
   d. further heating at a temperature of about 575°–800° C. to release volatile metaphosphoric acid and leave a residue of silicon pyrophosphate;
   e. heating at a temperature of about 800°–1,000° C. to decompose said silicon pyrophosphate to form phosphorous pentoxide and silicon dioxide.

8. The process of claim 7 wherein the relative proportions of orthophosphoric acid and siliceous material are between 2:1 and 8:1.

9. The process of claim 7 wherein said solid heteropoly complex acid has the formula $H_2SiO_3 \cdot XHPO_3$ where X is less than about 8.

10. The process of claim 7 wherein said other heteropoly acid complex with $P_2O_5$ adduct is represented by the general formula $H_2SiO_3 \cdot XP_2O_5 \cdot YHPO_3 \cdot YHPO$ wherein X and Y are each below 10.

11. The process of claim 7 wherein said $HPO_3$ and said $SiP_2O_7$ are recovered separately.

12. The process of claim 7 wherein the silica starting material is a solid amorphous $SiO_2$.

13. The process of claim 7 wherein the silica starting material is metasilicic acid.

14. A process for the production and recovery of oxygen-containing compounds of phosphorus or silicon from orthophosphoric acid and amorphous silica or its hydrates as starting materials which comprises mixing siliceous material selected from the group consisting of amorphous silica, metasilicic acid, disilicic acid and orthosilicic acid in an aqueous solution of orthophosphoric acid in a mol ratio of $H_3PO_4$ to siliceous material of 2:1 to 8:1 and thereafter heating the resulting mixture to produce intermediate heteropoly complex acid compounds which upon further heating within selected temperature ranges between about 275° C. to about 1,000° C. are capable of producing specified oxygen-containing compounds of phosphorus and silicon.

15. A process according to claim 14 wherein said mol ratio is 2:1–6:1 and said intermediate compounds are heated at 275°–295° C. to produce a dry, granular product suitable for use as heat-regeneratable desiccant and dehydrating agent.

16. A process according to claim 14 wherein said mol ratio is 6:1 to 8:1 and said intermediate heteropoly complex acid compounds are heated to 475°–525° C. to produce a product suitable as a source for metaphosphoric acid and phosphate phosphorous in water soluble and hydrolyzable form.

17. A process according to claim 14 wherein said mol ratio is 4:1 to 8:1, and said intermediate heteropoly complex acid compounds are first heated to 475°–500° C. and the resultant products thereafter further heated to 600° to 800° C. to liberate volatilized metaphosphoric acid.

18. A process according to claim 14 wherein said mol ratio is about 2:1, and said intermediate heteropoly complex acid compounds are first heated to about 500° C. to remove all water and thereafter further heating to 885° to 1,000° C. to effect sublimation of $P_2O_5$.

19. A process according to claim 14 wherein said mol ratio is 2:1 to 6:1 and said mixture is heated to either 300° or 500° C. to obtain a heteropoly acid complex of strongly acidic character and possessing strong dehydration capacity.

20. Dry, granular products suitable for use as heat-regeneratable desiccants and as dehydration reagents prepared in accordance with the process of claim 15.

21. Dry granular products suitable for use as source materials of metaphosphoric acid and phosphate phosphorus in water soluble and hydrolyzable form such as for use in high equivalent $P_2O_5$ content agricultural chemicals prepared in accordance with the process of claim 23.

22. Dry, granular products suitable for use as source materials for the production of metaphosphoric acid prepared in accordance with the process of claim 24.

23. Dry, granular products suitable for preparing sublimed $P_2O_5$ prepared in accordance with the process of claim 18.

24. Dry, granular products suitable for use as source materials of strongly ionizable hydrogen ions prepared in accordance with the process of claim 19.

* * * * *